US012620133B2

(12) United States Patent
Lanka et al.

(10) Patent No.: US 12,620,133 B2
(45) Date of Patent: May 5, 2026

(54) SYSTEM AND METHOD OF IMAGING

(71) Applicant: JIO PLATFORMS LIMITED, Ahmedabad (IN)

(72) Inventors: Raghuram Lanka, Hyderabad (IN); P. Balakrishna Reddy, Hyderabad (IN); Arun Banerjee, Navi Mumbai (IN); Pradip Gupta, Hyderabad (IN); Shubham Bhardwaj, Hyderabad (IN); Shailesh Kumar, Hyderabad (IN); Santanu Dasgupta, Mumbai (IN); Rahul Badhwar, Navi Mumbai (IN); Kenny Paul, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 366 days.

(21) Appl. No.: 18/000,364

(22) PCT Filed: May 28, 2021

(86) PCT No.: PCT/IN2021/054697
§ 371 (c)(1),
(2) Date: Nov. 30, 2022

(87) PCT Pub. No.: WO2021/245514
PCT Pub. Date: Dec. 9, 2021

(65) Prior Publication Data
US 2023/0377199 A1     Nov. 23, 2023

(30) Foreign Application Priority Data
May 30, 2020     (IN) .............................. 202021022766

(51) Int. Cl.
*G06T 7/90*          (2017.01)
*G06T 7/11*          (2017.01)
(Continued)

(52) U.S. Cl.
CPC .................. *G06T 7/90* (2017.01); *G06T 7/11* (2017.01); *G06T 7/20* (2013.01); *G06T 7/50* (2017.01);
(Continued)

(58) Field of Classification Search
CPC ..... G06T 7/90; G06T 7/11; G06T 7/20; G06T 7/50; G06T 2207/10024;
(Continued)

(56) References Cited

U.S. PATENT DOCUMENTS

2019/0195690 A1*  6/2019  Ben-Shahar ........... H04N 23/11
2021/0358106 A1*  11/2021  Liu ........................ G06T 7/0004

OTHER PUBLICATIONS

Fu, Ying et al. "Spectral Reflectance Recovery From a Single RGB Image." IEEE Transactions on Computational Imaging 4 (2018): 382-394 (Year: 2018).*
Mian, Ajmal, and Richard Hartley. "Hyperspectral video restoration using optical flow and sparse coding." Optics express vol. 20, 10 (2012): 10658-73. doi:10.1364/OE.20.010658 (Year: 2012).*
(Continued)

*Primary Examiner* — Matthew C Bella
*Assistant Examiner* — Janice E. Vaz
(74) *Attorney, Agent, or Firm* — FINNEGAN, HENDERSON, FARABOW, GARRETT & DUNNER, LLP

(57) ABSTRACT
A system and method for extracting a full range hyperspectral data from one or more RGB images. The method encompasses pre-processing, the one or more RGB images. Further the method encompasses estimating, an illumination component associated with each pre-processed RGB image. The method thereafter comprises removing, the illumination component from the each pre-processed RGB image. Further the method encompasses tracking, a trajectory of pixel (s) over frame(s) associated with the each pre-processed RGB image. The method then leads to identifying, a position of the pixel(s) in one or more adjacent frames of the frame(s) based on a patch defined around said one or more pixels. Thereafter the method encompasses extracting, the full
(Continued)

range hyperspectral data from the each pre-processed RGB image based on at least one of the removal of the illumination component, the trajectory of the pixel(s) and the position of the pixel(s).

14 Claims, 7 Drawing Sheets

(51) Int. Cl.
  *G06T 7/20*       (2017.01)
  *G06T 7/50*       (2017.01)
  *G06T 7/70*       (2017.01)
(52) U.S. Cl.
  CPC ...... *G06T 7/70* (2017.01); *G06T 2207/10024* (2013.01); *G06T 2207/10036* (2013.01); *G06T 2207/20081* (2013.01); *G06T 2207/20212* (2013.01); *G06T 2207/30004* (2013.01); *G06T 2207/30188* (2013.01); *G06T 2207/30241* (2013.01)
(58) Field of Classification Search
  CPC . G06T 2207/10036; G06T 2207/20081; G06T 2207/20212; G06T 2207/30004; G06T 2207/30188; G06T 2207/30241; H04N 9/67
  See application file for complete search history.

(56)                References Cited

OTHER PUBLICATIONS

A. Kazi, S. D. Sawarkar and D. J. Pete, "Image Restoration using Blind Deconvolution, " 2019 IEEE Pune Section International Conference (PuneCon), Pune, India, 2019, pp. 1-4, doi: 10.1109/PuneCon46936.2019.9105910 (Year: 2019).*

M. Maktab Dar Oghaz, , "Scene and Environment Monitoring Using Aerial Imagery and Deep Learning," in 2019 15th International Conference on Distributed Computing in Sensor Systems (DCOSS), Santorini Island, Greece, 2019, pp. 362-369, doi: 10.1109/DCOSS.2019.00078 (Year: 2019).*

Fu, Ying et al. "Spectral Reflectance Recovery From a Single RGB Image." /EEE Transactions on Computational Imaging 4 (2018): 382-394 (Year: 2018).*

International Search Report and Written Opinion issued by the International Searching Authority, in related Foreign Application No. PCT/IB2021/054697, dated Aug. 31, 2021, 11 pages.

Ying, Fu, et al: "Spectral Reflectance Recovery From a Single RGB Image", IEEE Transactions On Computational Imaging, IEEE, vol. 4, No. 3, Sep. 2018, pp. 382-394, XP011688816, ISSN: 2573-0436, DOI: 10.1109/TCI.2018.2855445.

Nguyen, R., et al: "Training-Based Spectral Reconstruction from a Single RGB Image", "ICIAP: International Conference on Image Analysis and Processing, 17th International Conference, Naples, Italy, Sep. 2013. Proceedings", Jan. 2014, Springer, Berlin, Heidelberg 032548, XP055434726, ISBN: 978-3-642-17318-9 vol. 8695, pp. 186-201, DOI: 10.1007/978-3-319-10584-0 13.

* cited by examiner

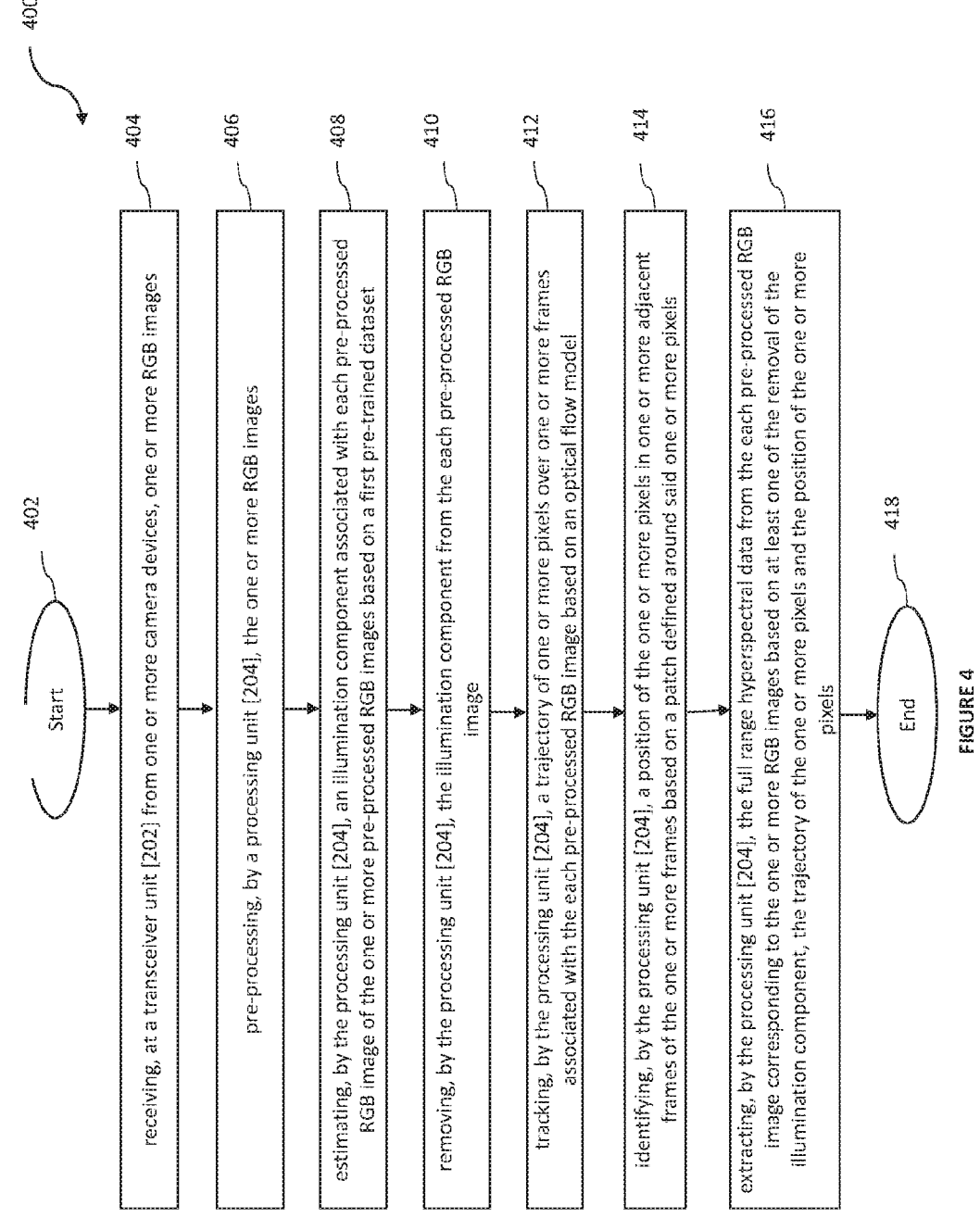

400

402 — Start

404 — receiving, at a transceiver unit [202] from one or more camera devices, one or more RGB images 406 — pre-processing, by a processing unit [204], the one or more RGB images 408 — estimating, by the processing unit [204], an illumination component associated with each pre-processed RGB image of the one or more pre-processed RGB images based on a first pre-trained dataset 410 — removing, by the processing unit [204], the illumination component from the each pre-processed RGB image 412 — tracking, by the processing unit [204], a trajectory of one or more pixels over one or more frames associated with the each pre-processed RGB image based on an optical flow model 414 — identifying, by the processing unit [204], a position of the one or more pixels in one or more adjacent frames of the one or more frames based on a patch defined around said one or more pixels 416 — extracting, by the processing unit [204], the full range hyperspectral data from the each pre-processed RGB image corresponding to the one or more RGB images based on at least one of the removal of the illumination component, the trajectory of the one or more pixels and the position of the one or more pixels 418 — End

SYSTEM AND METHOD OF IMAGING

TECHNICAL FIELD

The present invention generally relates to the field of image processing and more particularly, to systems and methods for extracting a full range hyperspectral data from one or more RGB images to at least have at least one of one or more spectral and quantitative information to improve accuracy of various application in agriculture, health and other allied fields using imaging systems.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With an enhancement in the field of digital technologies, the image processing technologies and imaging systems are also enhanced to a great extent. A camera phone/device, like many complex systems, is a result of converging and enabling technologies. The camera phone is a smart/feature mobile phone/device which is able to capture photographs and often record video using one or more built-in digital cameras and can also send the resulting image/video over the telephone function. The principal advantages of such devices are cost and compactness and use of their touch screens to direct their camera to focus on a particular object in the field of view, giving even an inexperienced user a degree of focus control exceeded only by seasoned photographers using manual focus. Digital cameras when compared with the camera phone/device, a consumer-viable camera in a mobile phone would require far less power and a higher level of camera electronics integration to permit miniaturization. A 'smart device or smart computing device or user equipment (UE) or user device' refers to any electrical, electronic, electro-mechanical computing device or equipment or a combination of one or more of the above devices. Also, a 'smartphone' or 'feature mobile phone' is one type of "smart computing device" that refers to a mobility wireless cellular connectivity device that allows end users to use services on cellular networks such as including but not limited to 2G, 3G, 4G, 5G and/or the like mobile broadband Internet connections with an advanced mobile operating system which combines features of a personal computer operating system with other features useful for mobile or handheld use.

Also, today a wireless network, that is widely deployed to provide various communication services such as voice, video, data, advertisement, content, messaging, broadcasts, etc. usually have multiple access networks, support communications for multiple users by sharing the available network resources. One example of such a network is the Evolved Universal Terrestrial Radio Access (E-UTRA) which is a radio access network standard meant to be a replacement of the UMTS and HSDPA/HSUPA technologies specified in 3GPP releases 5 and beyond. Unlike HSPA, LTE's E-UTRA is an entirely new air interface system, unrelated to and incompatible with W-CDMA. It provides higher data rates, lower latency and is optimized for packet data. The earlier UTRAN is the radio access network (RAN) was defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. As the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

3GPP has also introduced a new technology NB-IoT in release 13. The ow end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 KHz i.e. one PRB (Physical Resource Block) is allocated for this technology. The NB-IOT can be seen as a separate RAT (Radio Access Technology). The NB-IOT can be deployed in 3 modes as: "in-band", "guard band" and "standalone". In the "in-band" operation, resource blocks present within LTE carrier are used. There are specific resource blocks reserved for synchronization of LTE signals which are not used for NB-IOT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Also, over the past few years artificial intelligence and machine leaning techniques are also enhanced to a great extent. A generative adaptive network (GAN) is a class of machine learning where given a training set, this technique learns to generate new data with the same statistics as the training set. For example, a GAN trained on photographs can generate new photographs that look at least superficially authentic to human observers, having many realistic characteristics. Though originally proposed as a form of generative model for unsupervised learning, GANs have also proven useful for semi-supervised learning, fully supervised learning, and reinforcement learning. Also, a Gaussian process is a stochastic process (a collection of random variables indexed by time or space), such that every finite collection of those random variables has a multivariate normal distribution, i.e. every finite linear combination of them is normally distributed. The distribution of a Gaussian process is the joint distribution of all those (infinitely many) random variables, and as such, it is a distribution over functions with a continuous domain, e.g. time or space. A machine-learning algorithm that involves a Gaussian process uses lazy learning and a measure of the similarity between points (the kernel function) to predict the value for an unseen point from training data. The prediction is not just an estimate for that point, but also has uncertainty information—it is a one-dimensional Gaussian distribution (which is the marginal distribution at that point). For multi-output predictions, multivariate Gaussian processes are used, for which the multivariate Gaussian distribution is the marginal distribution at each point.

Furthermore, artificial intelligence, cognitive modeling, and neural networks are information processing paradigms inspired by the way biological neural systems process data. Artificial intelligence and cognitive modeling try to simulate some properties of biological neural networks. In the artificial intelligence field, artificial neural networks have been applied successfully to speech recognition, image analysis and adaptive control. A neural network (NN), in the case of artificial neurons called artificial neural network (ANN) or simulated neural network (SNN), is an interconnected group of natural or artificial neurons that uses a mathematical or computational model for information processing based on a connectionist approach to computation. In most cases an ANN is an adaptive system that changes its structure based on external or internal information that flows through the network. In more practical terms neural networks are non-linear statistical data modeling or decision-making tools. They can be used to model complex relationships between inputs and outputs or to find patterns in data Further, in the field of image processing an RGB color model is a color model with red, green, and blue light added together in various ways to reproduce a broad array of colors. The name of the model comes from the initials of the three additive primary colors, red, green, and blue. This model is used for sensing, representation and display of images in electronic systems, such as mobile, smartphones, televisions and computers, though it has also been used in conventional/digital photography. This model is a device-dependent color model: different devices detect or reproduce a given RGB value differently, since the color elements (such as phosphors or dyes) and their response to the individual R, G, and B levels vary from manufacturer to manufacturer, or even in the same device over time. Thus, an RGB value does not define the same color across devices without some kind of color management.

Also, an image scanner is a device that optically scans images (printed text, handwriting, or an object) and converts it to a digital image which is transferred to a computer/smart phone where most of them support RGB color. Currently available scanners typically use charge-coupled device (CCD) or contact image sensor (CIS) as the image sensor, whereas older drum scanners use a photomultiplier tube as the image sensor. Due to heating problems, the worst of them being the potential destruction of the scanned film, this technology was later replaced by non-heating light sources such as color LEDs. Also, there need to be proper reproduction of colors, especially in professional environments, which requires color management of all the devices involved in the production process, many of them using RGB. The color management results in several transparent conversions between device-independent and device-dependent color spaces (RGB and others, as CMYK for color printing) during a typical production cycle, in order to ensure color consistency throughout the process. Along with the creative processing, such interventions on digital images can damage the color accuracy and image detail, especially where the gamut is reduced.

Furthermore, the human eye sees color of visible light in mostly three bands (long wavelengths perceived as red, medium wavelengths—perceived as green, and short wavelengths perceived as blue), spectral imaging divides the spectrum into many more bands. This technique of dividing images into bands can be extended beyond the visible. In hyperspectral imaging, the recorded spectra have fine wavelength resolution and cover a wide range of wavelengths. Hyperspectral imaging measures continuous spectral bands, as opposed to multispectral imaging which measures spaced spectral bands. Hyperspectral imaging, like other spectral imaging, collects and processes information from across the electromagnetic spectrum. The goal of hyperspectral imaging is to obtain the spectrum for each pixel in the image of a scene, with the purpose of finding objects, identifying materials, or detecting processes. As modern acquisition technology became available, the hyperspectral imaging has also been an active area of research. The goal of hyperspectral imaging is the acquisition of a complete spectral signature reflected from each observable point unlike RGB (Red-Green-Blue) as above or multispectral acquisition devices. Hyper-Spectral (HS) imagery has been proved to be greater source of information than RGB image. The utility of HS imagery is varied in many fields viz. agriculture, medical, geology, astronomical, security etc.

For instance, Hyper-Spectral (HS) imagery can be used to measure plant phenotyping parameters. Plant phenotyping is an emerging science that links genomics with plant ecophysiology and agronomy. The functional plant body (PHENOTYPE) is formed during plant growth and development from the dynamic interaction between the genetic background (GENOTYPE) and the physical world in which plants develop (ENVIRONMENT). According to various researches large-scale experiments in plant phenotyping are a key factor in breeding better crops that are needed for feeding a growing population and providing biomass for energy, while using less water, land, and fertilizer.

The richness of hyperspectral imaging related information is associated with higher price of the sensor for capturing complete spectral signature. The Hyperspectral Imaging Systems (HIS) facilitates numerous applications due to richness of the information, but it also comes at a price and a significant decrease in spatial or temporal resolution. The use of HIS has been limited to those domains and applications such as remote sensing, agriculture, geology, astronomy, earth sciences, and others in which these aspects of the signal (either spatial, but mostly temporal resolution) are not central. Even in these cases, the HIS is often used for the preliminary analysis of observable signals in order to characterize the parts of the spectrum that carry valuable information for the application. This information is then used to design multispectral devices (cameras with a few spectral bands) that are optimized for that applications. Unlike their use in niche or dedicated applications such as the above, the use of HISs in general computer vision, and particularly in the analysis of natural images, is still in its infancy. The main obstacles are not only the spatial, spectral, and/or temporal resolution while acquiring a hyperspectral image "cube", but also the cost of the hyperspectral devices that acquire them, and their physical size (weight and volume), both being excessive and presenting a severe limitation for most possible applications. Hence, both high cost, bulky hardware systems and sophisticated sensor including detection system with temperature cooling units severely limits industrial application of hyperspectral technology in any field.

Furthermore, there are many other limitations also associated with the current solutions related to imaging technologies such as the agriculture system (such as in India or in other countries) is unique in terms of fragmented land holdings, Inter-field and Intra-field variabilities, agriculture input parameters varies in time and space. The satellite imagery has low resolution and good for weather data. The drone-based imagery technology is still a high cost and regulatory policy driven. Hence, there is an enormous opportunity to deliver a ground based precise and low-cost solution to sense various crop parameters at scale to provide precision, personalized and timely advisories to farmers.

Also, currently, there are no reasonably accurate "all-in-one sensor" smart device to capture images with low cost processing to measure various plant phenotyping parameters such as (nutrients, early disease prediction, harvesting decision, pesticide/insecticide) based on which valid advisory to farmers can be provided for right solutions to grow the plant crops. The inter-field and Intra-field variabilities in agriculture or any such allied fields, where image analysis is in demand, requires "differential treatment" as opposed to "uniform treatment" regime of traditional management system. Hence, it increases overall input cost for farming community.

Another limitation in the current technologies is that there are only few solutions for transforming RGB to hyperspectral data and currently this transformation can happen only in the range of 400-700 nm while beyond 700 nm, there are no solution available for such transformation from RGB to hyperspectral data/images. Thus there is an inherent need for method and system that can recover full range hyperspectral data from RGB images through low-cost, high resolution ground-based devices with the help of artificial intelligence that could self-build and map parameters such as plant phenotyping from the existing RGB images to hyperspectral images. Also, there is a limitation in the current technologies to upscale RGB images captured via smartphone devices to hyperspectral images so that we get precision images at low cost where hyperspectral images can sense most of crop parameters in a very accurate way, Another limitation in the current technologies is, that there is no method and system that can measure various crop input parameters using a low-cost phone camera technology for RGB image capturing and converting to Hyperspectral images to provide informative output to farmers or to agri-enterprises for precision and decision based agriculture support services to farmers. Also, one of the limitation in the current technologies is that there is no method and system that can provide Hyperspectral level high accuracy Crop type classification, growth stages classification in crops and disease identification simultaneously using low cost technology and is independent of bulky hardware systems, Currently, there are no solutions available for "all-in-one sensor" smart device to capture images with low cost processing, measure various plant phenotyping parameters such as nutrients, early disease prediction, harvesting decision, pesticide/insecticide and provided the right solutions or valid advisory to farmers to grow the plant crops based on RGB images converted to hyperspectral images. Also, currently there are no solution that can generate more features from less features.

Therefore, there is a need for a novel system and method for extracting a full range hyperspectral data from one or more RGB images to at least have at least one of one or more spectral and mathematical information to improve accuracy for various application in agriculture, health and other allied fields.

The foregoing examples of the related art and limitations related therewith are intended to be illustrative and not exclusive. Other limitations of the related art will become apparent to those of skill in the art upon a reading of the specification and a study of the figures.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a system and method for extracting a full range hyperspectral data from one or more RGB images. It is also an object of the present invention to provide a method and system that can recover full range hyperspectral data from RGB images through low-cost, high resolution ground-based devices with the help of artificial intelligence that could self-build and map plant phenotyping from the existing RGB images to hyperspectral images. Another object of the present invention is to provide solution that can provide accurate "all-in-one sensor" smart device to capture images with low cost processing to measure various plant phenotyping parameters. Also, an object of the present invention is to provide method and system to intelligently identify and notify inter-field and intra-field variabilities in agriculture or any such allied fields, where image analysis is in demand and requires "differential treatment" as opposed to "uniform treatment" regime of traditional management system. Another object of the present invention is to provide a solution that helps to transformation from RGB to hyperspectral beyond 700 nm with current in the range of only 400-700 nm. Also, an object of the present invention is to provide a solution that can upscale RGB images to hyperspectral images so that we get precision images at low cost where hyperspectral images can sense most parameters such as crop and health related parameters in an accurate way. Another object of the present invention is to provide a solution that can help in converting RGB images to hyperspectral images to provide informative output to farmers or to agri-enterprises for precision and decision-based agriculture support services to farmers. Also, an object of the present invention is provide a mechanism that can provide RGB to Hyperspectral image conversion technology for Crop type classification, growth stages classification in crops and disease identification simultaneously, Another object of the present invention is to provide a device ecosystem that provides a seamless enhancement of image analysis with RGB to hyperspectral level images to provide informative output for precision and decision services in multi-SIM, multi-active wireless devices. Yet another object of the present invention is to provide a seamless enhancement of image analysis with hyperspectral images to provide informative output for precision and decision services in the user devices independent of whether the UE is 5G/4G/3G/ EV-Do/eHRPD capable technology. Also, an object of the present invention is to add value to services to farmers and improving per hectare crop yield. Furthermore, an object of the present invention is to add value to mobile/smart phone (s) with enhancement of image analysis with hyperspectral images and/or to device selling to Agri-enterprises (pesticide, seed, fertilizer companies etc.), Industrial orchards. Another object of the present invention is to add value with input rich to information and technology rich digital agriculture, serving dual purpose of enhancing productivity with low input cost and reducing ecological burden of soil. Yet another object of the present invention is to upscale RGB images to hyperspectral images so that we get precision images at low cost where hyperspectral images can sense most of parameters in an accurate way for precision and decision-based support services to any other sectors like health or allied areas.

In order to achieve the aforementioned objectives, the present invention provides a method and system for extracting a full range hyperspectral data from one or more RGB images.

An aspect of the present invention relates to a method for extracting a full range hyperspectral data from one or more RGB images. The method encompasses receiving, at a transceiver unit from one or more camera devices, one or more RGB, images. The method thereafter leads to pre-processing, by a processing unit, the one or more RGB images. Further the method encompasses estimating, by the processing unit, an illumination component associated with each pre-processed RGB image of the one or more pre-processed RGB images based on a first pre-trained dataset. The method thereafter comprises removing, by the processing unit, the illumination component from the each pre-processed RGB image. Further the method encompasses tracking, by the processing unit, a trajectory of one or more pixels over one or more frames associated with the each pre-processed RGB image based on an optical flow model. The method then leads to identifying, by the processing unit, a position of the one or more pixels in one or more adjacent frames of the one or more frames based on a patch defined around said one or more pixels, Thereafter the method encompasses extracting, by the processing unit, the full range hyperspectral data from the each pre-processed RGB image corresponding to the one or more RGB images based on at least one of the removal of the illumination component, the trajectory of the one or more pixels and the position of the one or more pixels.

Another aspect of the present invention relates to a system for extracting a full range hyperspectral data from one or more RGB images. The system comprises a transceiver unit, configured to receive from one or more camera devices, one or more RGB images. Thereafter, the system comprises a processing unit, configured to pre-process, the one or more RGB images. Further, the processing unit is configured to estimate, an illumination component associated with each pre-processed RGB image of the one or more pre-processed RGB images based on a first pre-trained dataset. The processing unit is then configured to remove, the illumination component from the each pre-processed RGB image. Thereafter, the processing unit is configured to track, a trajectory of one or more pixels over one or more frames associated with the each pre-processed RGB image based on an optical flow model. The processing unit is further configured to identify, a position of the one or more pixels in one or more adjacent frames of the one or more frames based on a patch defined around said one or more pixels. Further processing unit is configured to extract, the full range hyperspectral data from the each pre-processed RGB image corresponding to the one or more RGB images based on at least one of the removal of the illumination component, the trajectory of the one or more pixels and the position of the one or more pixels.

The following numbered paragraphs are also disclosed:

1. A method for extracting a full range hyperspectral data from one or more RGB images, the method comprising:

receiving, at a transceiver unit [202] from one or more camera devices, one or more RGB images;

pre-processing, by a processing unit [204], the one or more RGB, images;

estimating, by the processing unit [204], an illumination component associated with each pre-processed RGB image of the one or more pre-processed RGB images based on a first pre-trained dataset;

removing, by the processing unit [204], the illumination component from the each pre-processed RGB image;

tracking, by the processing unit [204], a trajectory of one or more pixels over one or more frames associated with the each pre-processed RGB image based on an optical flow model;

identifying, by the processing unit [204], a position of the one or more pixels in one or more adjacent frames of the one or more frames based on a patch defined around said one or more pixels; and extracting, by the processing unit [204], the full range hyperspectral data from the each pre-processed RGB image corresponding to the one or more RGB images based on at least one of the removal of the illumination component, the trajectory of the one or more pixels and the position of the one or more pixels.

2. The method as stated in paragraph 1, wherein the pre-processing comprises at least of a resizing of the one or more RGB images, de-noising of the one or more RGB images and enhancing an image quality of the one or more RGB images.

3. The method as stated in paragraph 1, wherein the one or more camera devices comprises one or more Micro-Electro-Mechanical Systems (MEMS).

4. The method as stated in paragraph 1, wherein the one or more RGB images are received at the transceiver unit [202] via a master node associated with the one or more camera devices.

5. The method as stated in paragraph 1, wherein the extracting, by the processing unit [204], the full range hyperspectral data is further based on a second pre-trained dataset, wherein the second pre-trained dataset comprises a plurality of data trained based on a frame by frame conversion of a plurality of RGB images to corresponding Hyperspectral level resolution.

6. The method as stated in paragraph 1, wherein the first pre-trained dataset comprises a plurality of data trained based on a depth value associated with each object captured in each image of a plurality of RGB images.

7. The method as stated in paragraph 6, wherein estimating, by the processing unit [204], an illumination component associated with each pre-processed RGB image further comprises:

assigning, by the processing unit [204], a depth value to every RGB pixel associated with the each pre-processed RGB image based on the first pre-trained dataset, synthesizing, by the processing unit [204], one or more images of one or more objects captured in the each pre-processed RGB image under one or more illumination conditions based on the depth value assigned to the every RGB pixel, and estimating, by the processing unit [204], the illumination component associated with the each pre-processed RGB image based on the synthesized one or more images of the one or more objects, wherein the illumination component is estimated on a pixel level scale.

8. The method as stated in paragraph 7, wherein the estimating, by the processing unit [204], the illumination component is further based on one or more Artificial intelligence techniques.

9. The method as stated in paragraph 1, the method comprises determining, by the processing unit [204], a target RGB value associated with the each pre-processed RGB image under an ideal condition based on:

the removing, by the processing unit [204], the illumination component from the each pre-processed RGB, image, retrieving, by the processing unit [204], an original RGB pixel value of one or more pixels of the each pre-processed RGB image based on the removal of the illumination component, and determining, by the processing unit [204], the target RGB value based on the original RGB pixel value of the one or more pixels of the each pre-processed RGB image.

10. The method as stated in paragraph 1, the method further comprises performing by the processing unit [204], a pixel-level semantic segmentation on an object of interest present in the full range hyperspectral data corresponding to each RGB image of the one or more RGB images.

11. The method as stated in paragraph 10, wherein the pixel-level semantic segmentation is performed based on one or more Artificial intelligence techniques.

12. The method as stated in paragraph 10, the method further comprises:

organising, by the processing unit [204], the full range hyperspectral data corresponding to the each RGB image in one or more band-subsets having similar spectral signatures, and extracting, by the processing unit [204], one or more spectral and one or more spatial features from the full range hyperspectral data corresponding to the each RGB image based on the organising.

13. The method as stated in paragraph 12; the method further comprises determining, by the processing unit [204], one or more parameters related to at least one of an agriculture and health field based on the one or more extracted spectral features, the one or more extracted spatial features and a third pre-trained dataset.

14. The method as stated in paragraph 12, wherein the third pre-trained dataset comprises a plurality of data trained based on a hyperspectral data and a RGB-depth data associated with a plurality of events associated with at least one of the agriculture and the health field.

15. A system for extracting a full range hyperspectral data from one or more RGB images, the system comprising:

a transceiver unit [202], configured to receive from one or more camera devices, one or more RGB images; and a processing unit [204], configured to:

pre-process, the one or more RGB images, estimate, an illumination component associated with each pre-processed RGB image of the one or more pre-processed RGB images based on a first pre-trained dataset, remove, the illumination component from the each pre-processed RGB image, track, a trajectory of one or more pixels over one or more frames associated with the each pre-processed RGB image based on an optical flow model, identify, a position of the one or more pixels in one or more adjacent frames of the one or more frames based on a patch defined around said one or more pixels, and extract, the full range hyperspectral data from the each pre-processed RGB image corresponding to the one or more RGB images based on at least one of the removal of the illumination component, the trajectory of the one or more pixels and the position of the one or more pixels.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

FIG. 4 illustrates an exemplary method flow diagram [400], depicting a method for extracting a full range hyperspectral data from one or more RGB images, in accordance with exemplary embodiments of the present invention.

FIG. 5 (i.e.

Figure 1:
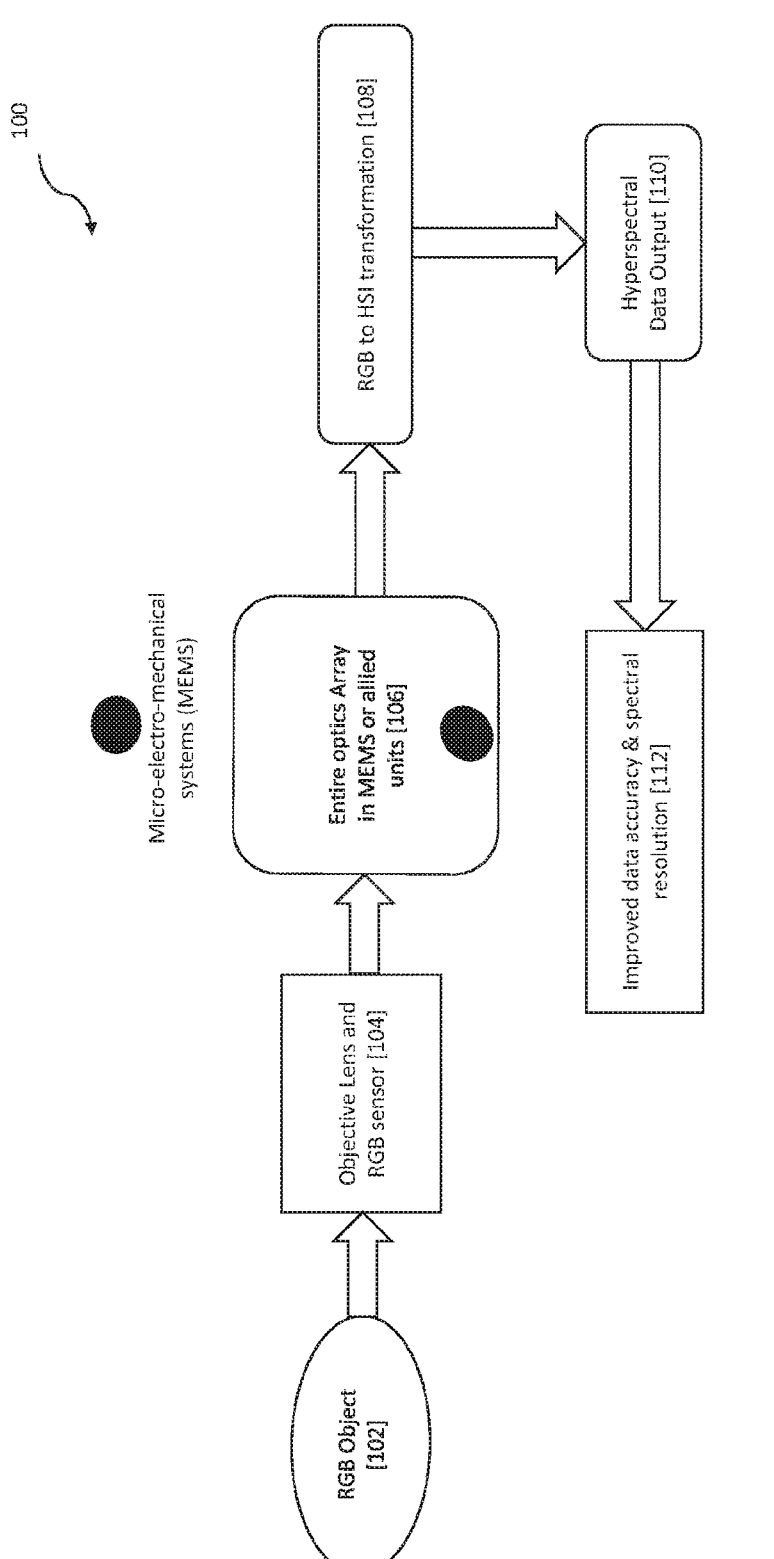
FIG. 1 illustrates an exemplary system architecture [100] for RGB to Hyperspectral transformation as an integration part of a User Equipment (UE), in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details, Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Also, it is noted that individual embodiments may be described as a process which is depicted as a flowchart, a flow diagram, a sequence diagram, a data flow diagram, a structure diagram, or a block diagram, Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "first", "second", "primary" and "secondary" are used to distinguish one element, set, data, object, step, process, function, activity or thing from another, and are not used to designate relative position, or arrangement in time or relative importance, unless otherwise stated explicitly. The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," and "communicating" and as used herein include both conveying data from a source to a destination, and delivering data to a communications medium, system, channel, network, device; wire, cable, fiber, circuit and/or link to be conveyed to a destination and the term "communication" as used herein means data so conveyed or delivered. The term "communications" as used herein includes one or more of a communications medium, system, channel, network, device, wire, cable, fiber, circuit and link.

Moreover, terms like "user equipment" (UE), "electronic device", "mobile station", "user device", "mobile subscriber station," "access terminal," "terminal," "smartphone," "smart computing device," "handset," and similar terminology refers to any electrical, electronic, electro-mechanical equipment or a combination of one or more of the above devices. Smart computing devices may include, but not limited to, a mobile phone, smart phone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/sensitive information. The said device operates at all the seven levels of ISO reference model, hut the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G, 5G and the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE Internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices. Furthermore, the foregoing terms are utilized interchangeably in the subject specification and related drawings.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. Furthermore, the term "processor" as used herein includes, but is not limited to one or more computers, hardwired circuits, signal modifying devices and systems, devices and machines for controlling systems, central processing units, programmable devices and systems, systems on a chip, systems comprised of discrete elements and/or circuits, state machines, virtual machines, data processors, processing facilities and combinations of any of the foregoing. The processor may perform signal coding data processing, input/output processing, and/or any other functionality that enables the working of the system according to the present disclosure. More specifically, the processor or processing unit is a hardware processor. The term "processor" as used herein means processing devices, apparatus, programs, circuits, components, systems and subsystems, whether implemented in hardware, tangibly-embodied software or both, and whether or not programmable.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The memory unit as used herein is configured to retain data, whether on a temporary or permanent basis, and to provide such retained data to various units to perform their respective functions.

As used herein the "Transceiver Unit" may include but not limited to a transmitter to transmit data to one or more destinations and a receiver to receive data from one or more sources. Further, the Transceiver Unit may include any other similar unit obvious to a person skilled in the art, to implement the features of the present invention. The transceiver unit may convert data or information to signals and vice versa for the purpose of transmitting and receiving respectively.

As disclosed in the background section, the existing technologies have many limitations and in order to overcome at least some of the limitations of the prior known solutions, the present disclosure provides a solution for extracting a full range hyperspectral data from one or more RGB images for various application in agriculture, health and other allied fields. In an implementation, the present invention provides a solution to recover full range hyperspectral data from the one or more RGB images through low-cost, high resolution ground-based devices with the help of artificial intelligence that could self-build and map parameters (such as plant phenotyping and/or health related parameters) from the existing RGB images to hyperspectral images. Also, based on the implementation of the features of the present invention improved data accuracy and spectral resolution is achieved. For instance, at least one of one or more spectral and mathematical information from the full range hyperspectral data is obtained to improve accuracy of various application in agriculture, health and other allied fields. FIG. 1 depicts an exemplary system architecture [100] for RGB to Hyperspectral transformation as an integration part of a User Equipment (UE). More particularly, FIG. 1 depicts an exemplary optical Micro-Electro-Mechanical Systems (MEMS) spectral technology-based UE where at least one image is captured using an RGB sensor which is then transformed to corresponding Hyperspectral information.

Furthermore, at [102] FIG. 1 depicts an RGB object such as a sample object or a scene to be captured. Further at [104] and [106], an objective lens along with the RGB sensor and an entire optics array in MEMS or allied units are shown respectively, to capture the at least one image of the RGB object. In an implementation the MEMS UE initiates the capturing of the at least one image by an MEMS camera on the UE with supported parameters. Thereafter [108] depicts the transformation of the at least one RGB image to corresponding hyperspectral data. More particularly, the MEMS UE transmits data capture information (i.e. the at least one image) to a leader/master node of a local network of MEMS nodes which further uploads/publishes said information to a real-time database in a cloud server unit at least for transformation to hyperspectral data. The MEMS UE is configured to receive data corresponding to any changes happening to the database at the cloud server unit and any changes such as including but not limited to addition of an information from one or more sensors is replicated/synced on the MEMS UE and therefore a hyperspectral data output is received at the MEMS UE based on the transformation [110]. Thereafter, [112] indicates improved data accuracy and spectral resolution achieved based on the hyperspectral data output. More particularly, in an implementation the MEMS UE at regular intervals performs on-device calibration of the hyperspectral data output and displays one or more diagram plots. Therefore, the Hyperspectral information is utilized to enhance image analysis for providing better accuracies and resolution.

Hereinafter, exemplary embodiments of the present disclosure will be described in detail with reference to the accompanying drawings so that those skilled in the art can easily carry out the present disclosure.

Figure 2:
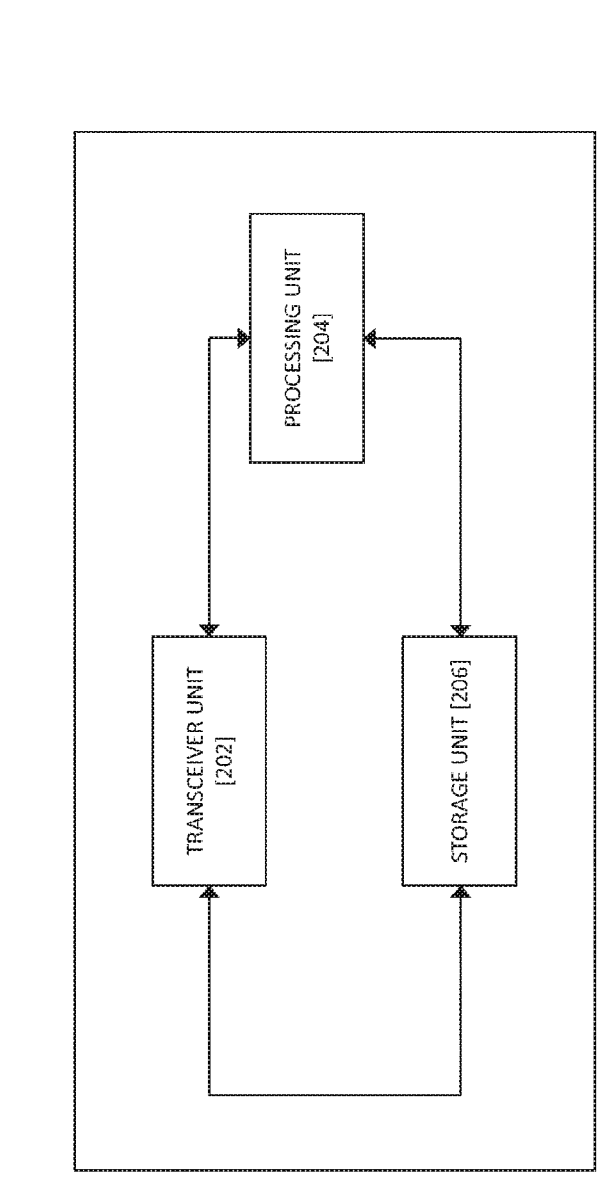
FIG. 2 illustrates an exemplary block diagram of a system [200] for extracting a full range hyperspectral data from one or more RGB images, in accordance with exemplary embodiments of the present invention.

Referring to FIG. 2, an exemplary block diagram of a system [200] for extracting a full range hyperspectral data from one or more RGB images, in accordance with exemplary embodiments of the present invention is shown.

The system [200] comprises, at least one transceiver unit [202], at least one processing unit [204] and at least one storage unit [208]. Also, all of the components/units of the system [100] are assumed to be connected to each other unless otherwise indicated below. Also, in FIG. 1 only a few units are shown, however, the system [200] may comprise multiple such units or the system [200] may comprise any such numbers of said units, as required to implement the features of the present disclosure.

The system [200], is configured to extract the full range hyperspectral data from the one or more RGB images, with the help of the interconnection between its components/units.

Figure 3:
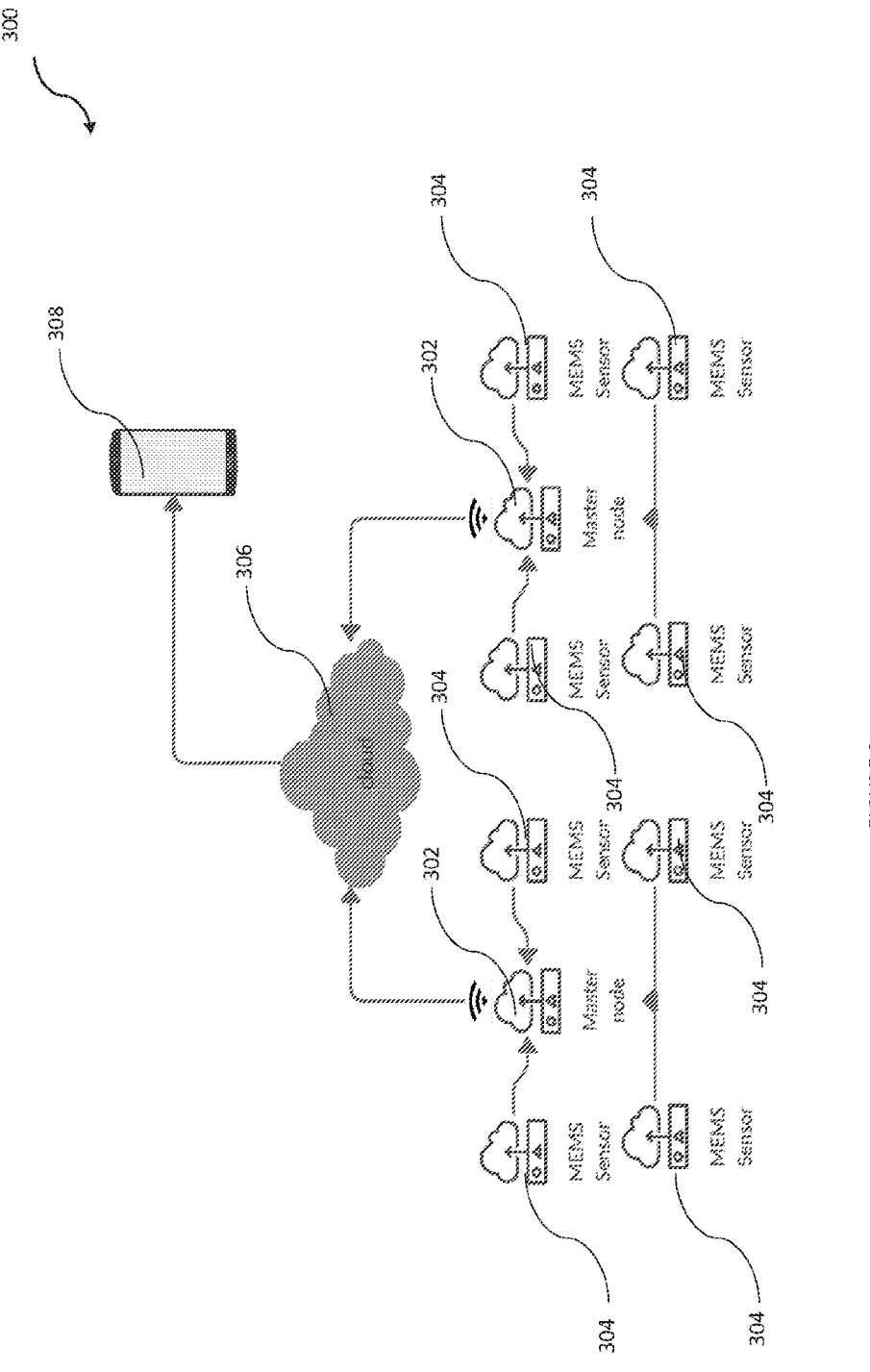
FIG. 3 illustrates an exemplary diagram [300] for collection of one or more RGB images for extracting a full range hyperspectral data from the one or more RGB images, in accordance with exemplary embodiments of the present invention.

In order to extract the full range hyperspectral data from the one or more RGB images, the transceiver unit [202] of the system [200] is configured to receive from one or more camera devices, one or more RGB images. Also, each image from the one or more RGB images may be a single image, a burst of images or a short video captured by the one or more camera devices. In an implementation the one or more camera devices may be one or more user equipment (such as a smartphone) having an image/video capturing capability, wherein the one or more user equipment are configured to capture the one or more RGB images. Therefore, in such implementation a UI on the one or more user equipment (UE) is configured to allow users to capture the one or more RGB images to process said one or more RGB images based on the implementation of the features of the present invention to further provide hyperspectral imaging based high resolution spectral signature that could deliver desired services in various fields such as agriculture, healthcare etc. Also in another implementation the one or more camera devices comprises one or more Micro-Electro-Mechanical Systems (MEMS), wherein the one or more MEMS camera devices/MEMS UE are configured to initiate an image and/or video capturing by an MEMS camera/sensor on the one or more MEMS UE with supported parameters, to capture the one or more RGB images. Furthermore, in such implementation the one or more RGB images are received at the transceiver unit [202] via a master node associated with the one or more camera devices/MEMS cameras. FIG. 3 illustrates an exemplary diagram [300] for collection of the one or more RGB images for extracting the full range hyperspectral data from the one or more RGB images, in accordance with exemplary embodiments of the present invention. FIG. 3 depicts a network of MEMS nodes comprising one or more leader/master nodes [302] and one or more MEMS sensors/cameras [304]. The one or more master nodes [302] are connected to a cloud server unit [306], wherein the cloud server unit [306] is further connected to a user device [308]. As indicated in FIG. 3, whenever an image is captured by the one or more MEMS cameras [304] with supported parameters, the one or more MEMS cameras i.e. one or more camera devices [304] relays data capture information i.e. the captured image to the one or more leader/master nodes [302] of the local network of the MEMS nodes [300]. The one or more local leader nodes [302] uploads/publishes the data capture information to a real-time database in the cloud server unit [306] via the transceiver unit [202]. More particularly, in the given implementation the transceiver unit [202] is configured to receive from the one or more master nodes [302], the data capture information i.e. the captured image, at the system [200] configured at the cloud server unit [306]. Also, in an implementation the transceiver unit [202] is further configured to transmit at the user device [308], a full range hyperspectral extracted by the system [100] from the captured image.

Once the one or more RGB images are received at the transceiver unit [202], the processing unit [204] connected to the transceiver unit [202], in order to extract the full range hyperspectral data from the one or more RGB images, is firstly configured to pre-process, the one or more RGB images. More particularly, the processing unit [204] is configured to pre-process the one or more RGB images by at least of a resizing of the one or more RGB images, de-noising of the one or more RGB images and enhancing an image quality of the one or more RGB images. The pre-processing of the one or more RGB images is achieved to resize, de-noise and enhance the image quality of the one or more RGB images, as the one or more RGB images may be received from one or more different or same camera devices in different sizes, resolutions and are subjected to different distortions by external environment.

Thereafter, the processing unit [204] is configured to estimate, an illumination component associated with each pre-processed RGB image of the one or more pre-processed RGB images based on a first pre-trained dataset. The first pre-trained dataset comprises a plurality of data trained based on a depth value associated with each object captured in each image of a plurality of RGB images. More particularly, the processing unit [204], to estimate the illumination component associated with each pre-processed RGB image is configured to assign, a depth value to every RGB pixel associated with the each pre-processed RGB image based on the first pre-trained dataset. Thereafter, the processing unit [202] synthesizes one or more images of one or more objects captured in the each pre-processed RGB image under one or more illumination conditions based on the depth value assigned to the every RGB pixel. Further the processing unit [204] is configured to estimate, the illumination component associated with the each pre-processed RGB image based on the synthesized one or more images of the one or more objects, wherein the illumination component is estimated on a pixel level scale. Also, the processing unit [204] is further configured to estimate the illumination component based on one or more Artificial intelligence techniques. In an implementation, one or more 3-dimensional point cloud representation of the one or more objects captured in the each pre-processed RGB image under the one or more illumination conditions are created based on the depth value assigned to the every RGB pixel associated with the each pre-processed RGB image, to estimate the illumination component on the pixel level scale for the each pre-processed RGB image.

The processing unit [204] is further configured to remove, the illumination component from the each pre-processed RGB, image. The illumination component is removed from the each pre-processed RGB image to achieve illumination independent RGB pixel values of one or more pixels of the each pre-processed RGB image in order to further obtain an actual RGB value (i.e. a target RGB value) associated with the each pre-processed RGB image under an ideal condition. More particularly, the processing unit [204] is configured to determine the target RGB value associated with the each pre-processed RGB image under the ideal condition based on the removal of the illumination component from the each pre-processed RGB image, a retrieval of an original (i.e. illumination independent) RGB pixel value of the one or more pixels of the each pre-processed RGB image by the processing unit [204] based on the removal of the illumination component and determining of the target RGB value (i.e. the actual RGB value) by the processing unit [204] based on the original RGB pixel value of the one or more pixels of the each pre-processed RGB image.

Thereafter, the processing unit [204] is configured to track, a trajectory of one or more pixels over one or more frames associated with the each pre-processed RGB, image based on an optical flow model. In an implementation, the processing unit [204] is configured to estimate the trajectory of the one or more pixels over different frames associated with the each pre-processed RGB image using the optical flow model (dense estimation). For instance, the processing unit [204] to track the trajectory of a pixel is configured to receive as an input one or more frames and/or videos for a pre-processed RGB image of an input image. Thereafter, the processing unit [204] is configured to include the received one or more frames and/or videos together for the same pixel based on the optical flow model to get better/more accurate hyperspectral representation of the input image.

Further, the processing unit [204] is configured to identify, a position of the one or more pixels in one or more adjacent frames of the one or more frames based on a patch defined around said one or more pixels. Also, the processing unit is configured to define the patch as a neighbourhood of pixels of the one or more pixels to aggregate a motion of the one or more pixels based on the neighbourhood based on an assumption that an optical flow of pixels in the neighbourhood is same. In an implementation the patch level aggregation of motion to identify the position of the one or more pixels is based on one or more artificial intelligence and machine learning techniques. In one of such implementation, a model is trained based on concatenated motion and RGB information, hyperspectral patch pairs, such that long short-term memory (LSTM) learns a structure/normal from one or more temporal images (i.e. internal 3-dimension representation of object(s)) to provide a better estimate as compared to any standard neural architecture which is simply given a single RGB image.

Thereafter the processing unit [204] is configured to extract, the full range hyperspectral data from the each pre-processed RGB image corresponding to the one or more RGB images based on at least one of the removal of the illumination component, the trajectory of the one or more pixels and the position of the one or more pixels. In an implementation the extraction of the full range hyperspectral data is further based on a second pre-trained dataset, wherein the second pre-trained dataset comprises a plurality of data trained based on a frame by frame conversion of a plurality of RGB images to corresponding Hyperspectral level resolution. For instance; the second pre-trained dataset may comprise a plurality of data trained based on a frame by frame conversion of a plurality of health filed related RGB images to corresponding hyperspectral level resolution, wherein in an implementation the processing unit is configured to map a pre-processed RGB image indicating a disease to said second pre-trained dataset to further extract corresponding full range hyperspectral data.

Further, the processing unit [204] is configured to perform a pixel-level semantic segmentation on an object of interest present in the full range hyperspectral data corresponding to each RGB image of the one or more RGB images. The pixel-level semantic segmentation is performed based on one or more Artificial intelligence techniques. Also, the pixel-level semantic segmentation is performed to separate the object of interest i.e. foreground from background.

Once the pixel-level semantic segmentation is performed, the processing unit [204] is configured to organise, the full range hyperspectral data corresponding to the each RGB image in one or more band-subsets having similar spectral signatures. Also, the processing unit [204] is further configured to extract at least, at least one of one or more spectral features and one or more spatial features from the full range hyperspectral data corresponding to the each RGB image based on the organising the full range hyperspectral data. The full range hyperspectral data is organized in band-subsets having similar spectral signatures as different parts of the object of interest may have different features such as different parts of crops have different chemical profile and the one or more spectral and the one or more spatial features are extracted to make it easier for the next stage to determine by the processing unit [204], one or more parameters related to at least one of an agriculture field, health field and the like fields.

Thereafter, the processing unit [204] is further configured to determine one or more parameters related to at least one of the agriculture and the health field based on the one or more extracted spectral features, the one or more extracted spatial features and a third pre-trained dataset. The third pre-trained dataset comprises a plurality of data trained based on a hyperspectral data and a RGB-depth data associated with a plurality of events associated with at least one of the agriculture and the health field. In an implementation, the third pre-trained dataset may comprise a hyperspectral data and an RGB-depth data of a plurality of crops indicating various growth stages, crop health/nutrition mapping data, disease progression mapping data. In such implementation the processing unit [204] is configured to map accurately hyperspectral signal patterns (i.e. one or more extracted spectral features and one or more extracted spatial features) of an RGB image of a crop to each crop parameter (like a certain band wave pattern for nitrogen, vegetative stage, reproductive stage, fungal disease, bacterial disease and so on) of the third pre-trained dataset to determine one or more parameters related to the crop to further predict one or more crop conditions. Also, in an instance the processing unit

[204] is configured to use computer vision Generative Adversarial Networks (GAN) to generate each hyperspectral signal pattern using RGB pattern i.e. the RGB-depth data encompassed in the third pre-trained dataset. Therefore, based on the one or more agriculture related parameters determined based on mapping of the hyperspectral signal patterns to the crop parameter(s), various services can be provided to farmers for crop growth stage dependent precision nutrition (to further reduce input cost, improve crop yield & soil quality), early disease prediction (to further reduce pesticide, fungicide, insecticide use and cost), and seed quality assessment as well as harvesting decision (to further reduce input cost and increasing shelf life of vegetables & fruits).

Furthermore, once the one or more parameters related to at least one of the agriculture, the health and other such field is determined, the transceiver unit [202] is configured to transmit said one or more parameters to a user device to further displays diagram plots indicating one or more agriculture, health and other such field related information. In an implementation, the transceiver unit [202] is configured to observe/listen to any changes happening to the storage unit [206] in order to transmit the updated information to the user device. Therefore, any changes, which include but not limited to addition of an information from the one or more camera devices/MEMS sensors is replicated/synced on the user device. Also, in an implementation, the user device at regular intervals performs on device calibration of readings collected from the transceiver unit [202] and displays diagram plots.

Referring to FIG. 4 an exemplary method flow diagram [400], depicting a method for extracting a full range hyperspectral data from one or more RGB images, in accordance with exemplary embodiments of the present invention is shown. In an implementation the method is performed by the system [200] and the system [200] may be configured at a cloud server unit. As shown in FIG. 4, the method begins at step [402].

At step [404] the method encompasses receiving, at a transceiver unit [202] from one or more camera devices, the one or more RGB images. Each RGB image from the one or more RGB images may be a single RGB image, a burst of RGB images or a short video captured by the one or more camera devices. In an implementation the one or more camera devices may be one or more user equipment such as a smartphone) having an image/video capturing capability, wherein the one or more user equipment are configured to capture the one or more RGB images. Therefore, in such implementation the method encompasses allowing by a UI on the one or more user equipment (UE), one or more users, to capture the one or more RGB images to process said one or more RGB images based on the implementation of the features of the present invention to further provide hyperspectral imaging based high resolution spectral signature that could deliver desired services in various fields such as agriculture, healthcare etc. Also in another implementation the one or more camera devices comprises one or more Micro-Electro-Mechanical Systems (MEMS), wherein in such implementation the method encompasses initiating by the one or more MEMS camera devices/MEMS UE, an image and/or video capturing using an MEMS camera/sensor of the one or more MEMS UE with supported parameters, to capture the one or more RGB images. Furthermore, in such implementation the one or more RGB images are received at the transceiver unit [202] via a master node associated with the one or more camera devices i.e. the one or more MEMS cameras. More particularly, the method encompasses relaying by the one or more MEMS cameras the one or more RGB images to the master node, wherein the master node uploads/publishes the one or more RGB images to a storage unit [206] configured at the cloud server unit via the transceiver unit [202].

Thereafter at step [406] the method comprises pre-processing, by a processing unit [204], the one or more RGB images. The pre-processing comprises at least of a resizing of the one or more RGB images, de-noising of the one or more RGB images and enhancing an image quality of the one or more RGB images. The pre-processing of the one or more RGB images is achieved to resize, de-noise and enhance the image quality of the one or more RGB images, as the one or more RGB images may be received from one or more different or same camera devices in different sizes, resolutions and are subjected to different distortions by external environment.

Next, at step [408] the method comprises estimating, by the processing unit [204], an illumination component associated with each pre-processed RGB image of the one or more pre-processed RGB images based on a first pre-trained dataset. The first pre-trained dataset comprises a plurality of data trained based on a depth value associated with each object captured in each image of a plurality of RGB images. Also, the process of estimating, by the processing unit [204], an illumination component associated with each pre-processed RGB image firstly encompasses assigning, by the processing unit [204], a depth value to every RGB pixel associated with the each pre-processed RGB image based on the first pre-trained dataset. The process thereafter leads to synthesizing, by the processing unit [204], one or more images of one or more objects captured in the each pre-processed RGB image under one or more illumination conditions based on the depth value assigned to the every RGB pixel. The process thereafter comprises estimating, by the processing unit [204], the illumination component associated with the each pre-processed RGB image based on the synthesized one or more images of the one or more objects, wherein the illumination component is estimated on a pixel level scale. Furthermore, the estimating, by the processing unit [204], the illumination component associated with the each pre-processed RGB is based on one or more Artificial intelligence techniques. In an implementation, one or more 3-dimensional point cloud representation of the one or more objects captured in the each pre-processed RGB image under the one or more illumination conditions are created based on the depth value assigned to the every RGB pixel associated with the each pre-processed RGB image, to estimate the illumination component on the pixel level scale for the each pre-processed RGB image. Further considering an example where if a pre-processed RGB image encompasses a burst of pre-processed RGB images of a particular flower, the method encompasses assigning, by the processing unit [204], a depth value to every RGB pixel associated with the burst of pre-processed RGB images of said particular flower based on a first pre-trained dataset, wherein the first pre-trained dataset comprises a plurality of data trained based on a depth value associated with said particular flower captured in each image of a plurality of RGB images. The method thereafter comprises synthesizing, by the processing unit [204], one or more images of said particular flower captured in the burst of pre-processed RGB images, under one or more illumination conditions, based on the depth value assigned to the every RGB pixel associated with the burst of pre-processed RGB images. Further the method encompasses estimating, by the processing unit [204], the illumination component associated with each image of the burst of pre-processed RGB images based on the synthesized one or more images of the particular flower, wherein the illumination component is estimated on a pixel level scale.

Further, at step [410] the method comprises removing, by the processing unit [204], the illumination component from the each pre-processed RGB image. The illumination component is removed from the each pre-processed RGB image to achieve illumination independent RGB pixel values of one or more pixels of the each pre-processed RGB image in order to further obtain an actual RGB value (i.e. a target RGB value) associated with the each pre-processed RGB image under an ideal condition. More particularly, the method comprises determining, by the processing unit [204], the target RGB value associated with the each pre-processed RGB image under the ideal condition based on the removing, by the processing unit [204], the illumination component from the each pre-processed RGB image, retrieving, by the processing unit [204], an original (i.e. illumination independent) RGB pixel value of the one or more pixels of the each pre-processed RGB image based on the removal of the illumination component and determining, by the processing unit [204], the target RGB value (i.e. the actual RGB value) based on the original RGB pixel value of the one or more pixels of the each pre-processed RGB image, Considering the above example where the illumination component associated with each image of the burst of pre-processed RGB images based on the synthesized one or more images of the particular flower is determined, the method in the given example further encompasses removing from all of the pre-processed burst RGB images of the particular flower the illumination component to retrieve an actual RGB pixel value (i.e. a target RGB value) associated with the burst of pre-processed RGB images.

Thereafter, at step [412] the method comprises tracking, by the processing unit [204], a trajectory of one or more pixels over one or more frames associated with the each pre-processed RGB image based on an optical flow model. In an implementation, the method comprises estimating by the processing unit [204], the trajectory of the one or more pixels over different frames associated with the each pre-processed RGB image using the optical flow model (i.e. dense estimation). For instance, the method to track the trajectory of a pixel comprises receiving by the processing unit [204] as an input one or more frames and/or videos for a pre-processed RGB image of an input image. Thereafter, the method encompasses including the received one or more frames and/or videos together for the same pixel based on the optical flow model to get better/more accurate hyperspectral representation of the input image.

Next, at step [414] the method comprises identifying, by the processing unit [204], a position of the one or more pixels in one or more adjacent frames of the one or more frames based on a patch defined around said one or more pixels. Also, the method comprises defining by the processing unit the patch as a neighbourhood of pixels of the one or more pixels to aggregate a motion of the one or more pixels based on the neighbourhood based on an assumption that an optical flow of pixels in the neighbourhood is same. In an implementation the patch level aggregation of motion to identify the position of the one or more pixels is based on one or more artificial intelligence and machine learning techniques. In one of such implementation, a model is trained based on concatenated motion and RGB information, hyperspectral patch pairs, such that long short-term memory (LSTM) learns a structure/normal from one or more temporal images (i.e. internal 3-dimension representation of object(s)) to provide a better estimate as compared to any standard neural architecture which is simply given a single RGB image.

Further, at step [416] the method comprises extracting, by the processing unit [204], the full range hyperspectral data from the each pre-processed RGB image corresponding to the one or more RGB images based on at least one of the removal of the illumination component, the trajectory of the one or more pixels and the position of the one or more pixels. Also, in an implementation the process of extracting, by the processing unit [204], the full range hyperspectral data is further based on a second pre-trained dataset, wherein the second pre-trained dataset comprises a plurality of data trained based on a frame by frame conversion of a plurality of RGB images to corresponding Hyperspectral level resolution. For instance, the second pre-trained dataset may comprise a plurality of data trained based on a frame by frame conversion of a plurality of agriculture related RGB images to corresponding hyperspectral level resolution, wherein in an implementation the method encompasses mapping by the processing unit [204], a pre-processed RGB image indicating a crop to said second pre-trained dataset to further extract corresponding full range hyperspectral data.

Also, the method further comprises performing by the processing unit [204], a pixel-level semantic segmentation on an object of interest present in the full range hyperspectral data corresponding to each RGB image of the one or more RGB images. The pixel-level semantic segmentation is performed based on one or more Artificial intelligence techniques. Also, the pixel-level semantic segmentation is performed to separate the object of interest (i.e. foreground) from background.

Once the pixel-level semantic segmentation is performed, the method comprises organising, by the processing unit [204], the full range hyperspectral data corresponding to the each RGB image in one or more band-subsets having similar spectral signatures. Further the method leads to extracting, by the processing unit [204], one or more spectral and one or more spatial features from the full range hyperspectral data corresponding to the each RGB image based on the organising the full range hyperspectral data. The full range hyperspectral data is organized in band-subsets having similar spectral signatures as different parts of the object of interest may have different features (such as different diseases have different parameters) and the one or more spectral and the one or more spatial features are extracted to make it easier for the next stage to determine by the processing unit [204], one or more parameters related to at least one of an agriculture field, health field and the like fields.

The method further comprises determining, by the processing unit [204], one or more parameters related to at least one of the agriculture and the health field based on the one or more extracted spectral features, the one or more extracted spatial features and a third pre-trained dataset. The third pre-trained dataset comprises a plurality of data trained based on a hyperspectral data and a RGB-depth data associated with a plurality of events associated with at least one of the agriculture and the health field. In an implementation, the one or more parameters are determined based on one or more Deep Learning/ML based recognition techniques. Further in an example, the third pre-trained dataset may comprise a hyperspectral data and an RGB-depth data of a plurality of health conditions of humans/animals indicating various recovery stages, health/nutrition mapping data, disease progression mapping data and the like. In such implementation the method encompasses mapping by the processing unit [204], one or more hyperspectral signal patterns (i.e. one or more extracted spectral features and one or more extracted spatial features) of an RGB image of a disease to each health condition parameter (like a body temperature pattern, oxygen level pattern, fungal disease, bacterial disease and so on) of the third pre-trained dataset to determine one or more parameters related to the disease to further predict one or more health conditions. Also, in an instance the method comprises using by the processing unit [204], computer vision Generative Adversarial Networks (GAN) to generate each hyperspectral signal pattern using RGB pattern i.e. the RGB-depth data encompassed in the third pre-trained dataset. Therefore, based on the one or more disease related parameters determined based on mapping of the hyperspectral signal patterns to the health condition parameter(s), various services can be provided in medical sectors.

Furthermore, once the one or more parameters related to at least one of the agriculture, the health and other such field is determined, the method encompasses transmitting by the transceiver unit [202], said one or more parameters to a user device to further displays diagram plots indicating one or more agriculture, health and other such field related information. In an implementation, the method encompasses observing by the transceiver unit [202] one or more changes happening to the storage unit [206] in order to transmit the updated information to the user device. Therefore, any changes, which include but not limited to addition of an information from the one or more camera devices/MEMS sensors is replicated/synced on the user device. Also, in an implementation, the user device at regular intervals performs on device calibration of readings collected from the transceiver unit [202] and displays diagram plots.

The method thereafter terminates at step [418].

Figure 5A:
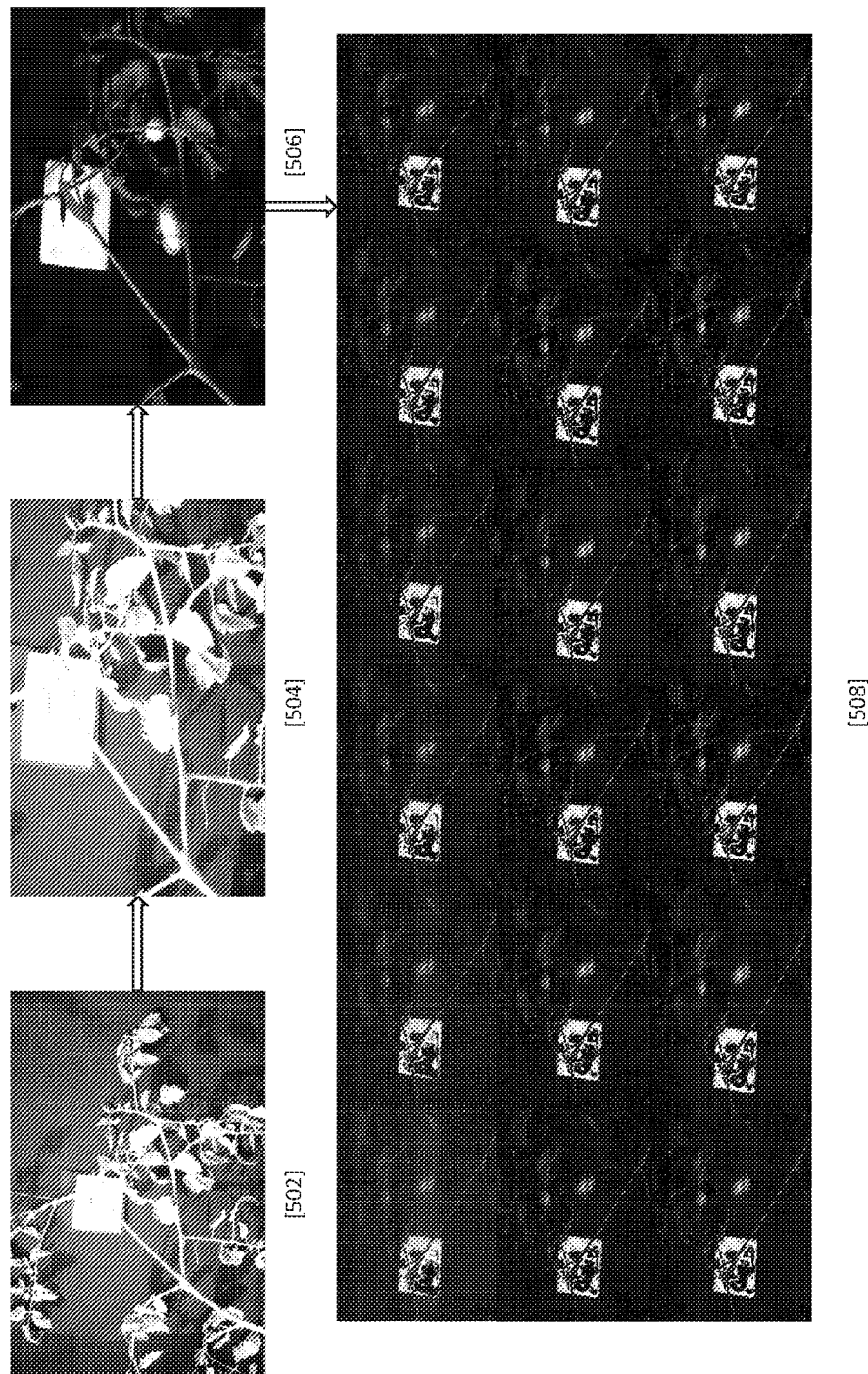
FIGS. 5a and 5b) illustrates an exemplary use case of extracting a full range hyperspectral data from one or more RGB images, in accordance with exemplary embodiments of the present invention.
Figure 5B:
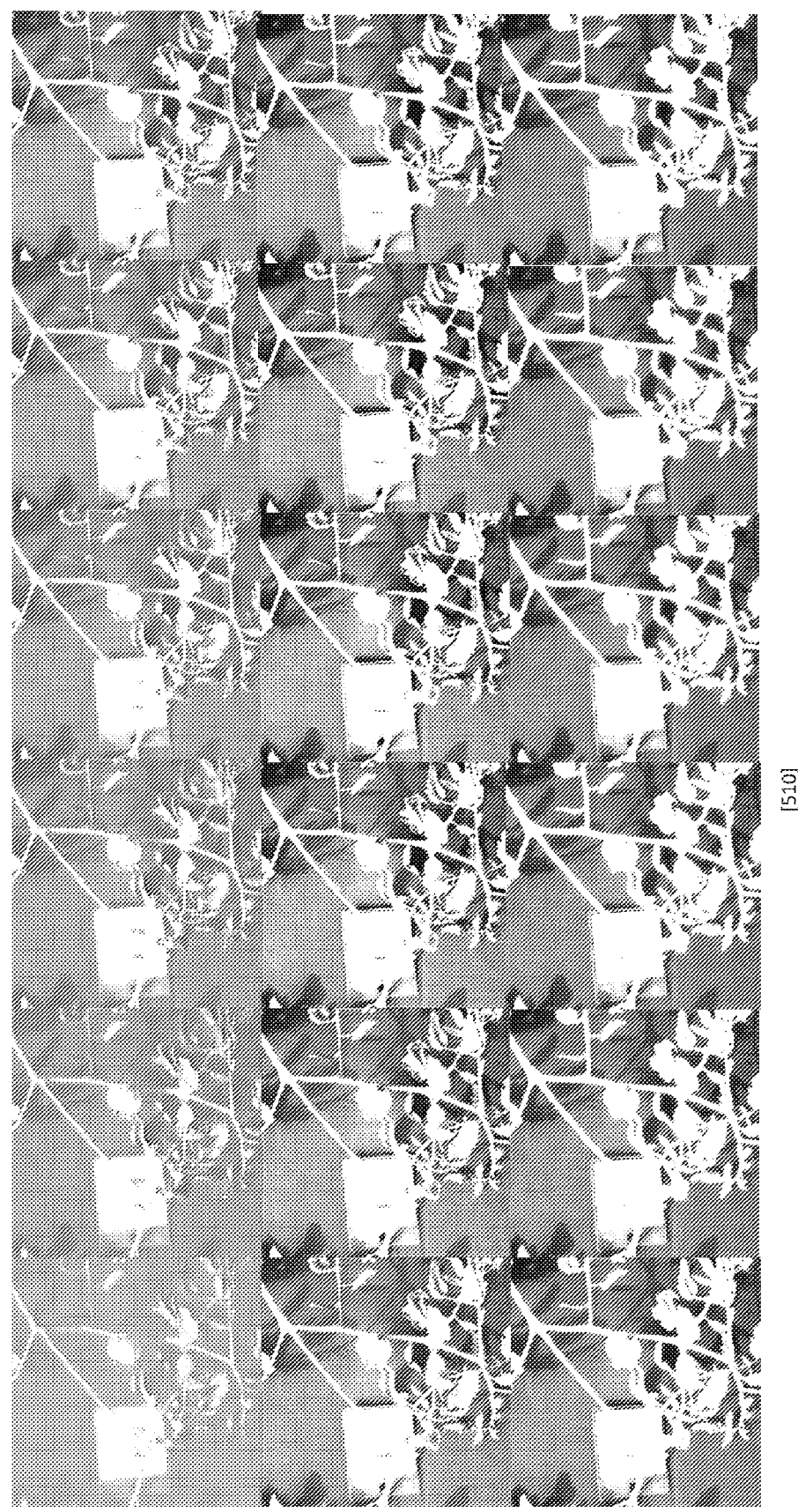

Referring to FIG. 5 (i.e. FIGS. 5a and 5b), an exemplary use case of extracting a full range hyperspectral data from one or more RGB images, in accordance with exemplary embodiments of the present invention is shown.

More particularly, FIG. 5a at [502] indicates a raw RGB image received from a camera device.

At [504], a pre-processed image corresponding to the received raw image is shown; wherein the pre-processing is done at least by cropping the received image to a region of interest.

Next at [506] illumination component is removed from the pre-processed image to obtain actual/true colours.

Further at [508] a hyperspectral data corresponding to the pre-processed image is determined and 18 bands of ground truth hyperspectral 31 band image are shown as an example. More particularly, each band depicts a spectral channels starting from 400 nm and ends at 700 nm such as 400, 410, 420, 430, 440, 450, 460, 470, 480, 490, 500, 510, 520, 530, 540, 550, 560, 570 nm . . . 700 nm. Therefore, each band has 10 nm increment.

Thereafter, at [510] in FIG. 5b, reconstructed 18 bands of the hyperspectral 31 band image are shown as an example to extract one or more spectral features and one or more spatial features.

Figure 6:
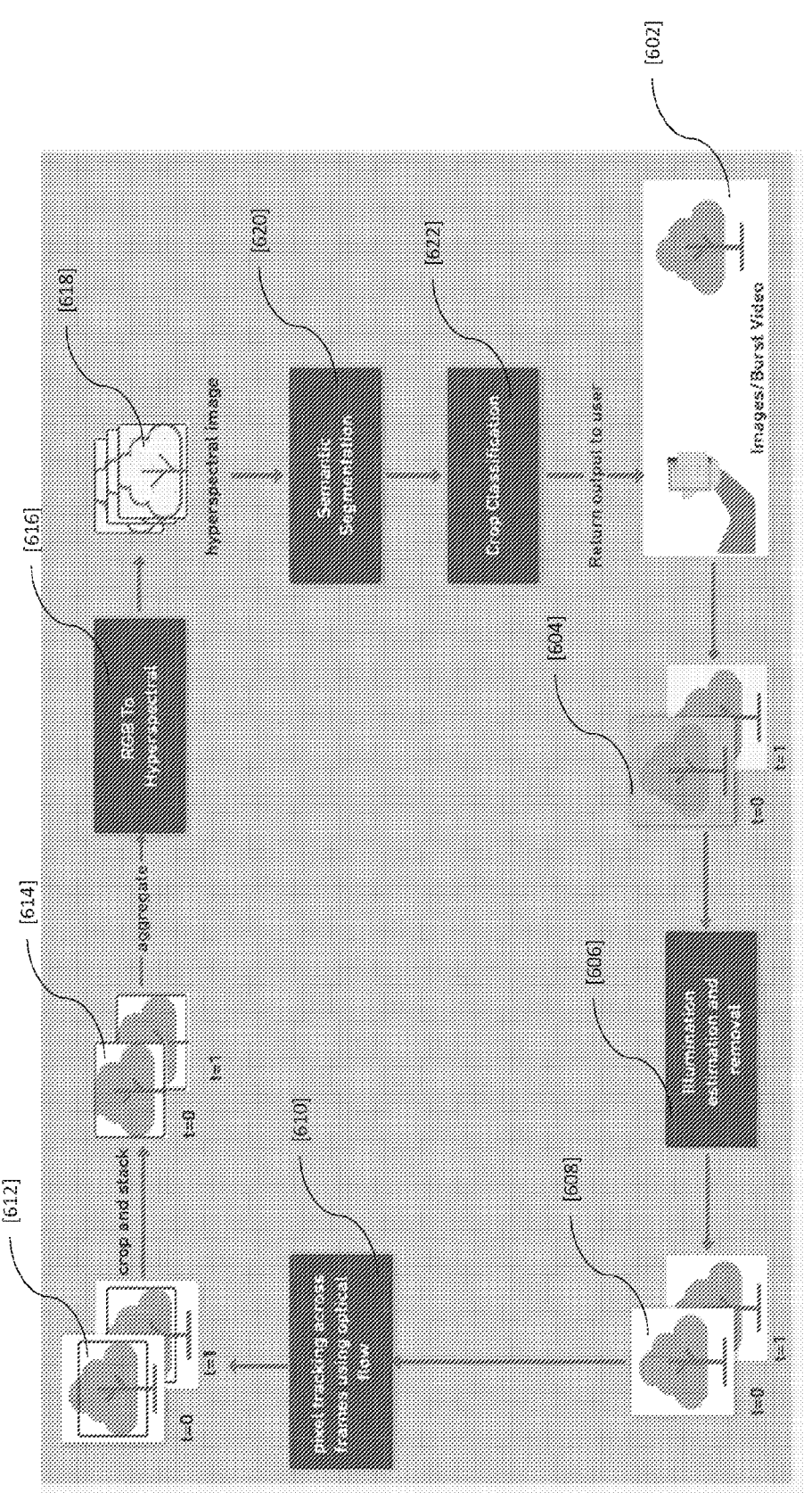
FIG. 6 illustrates an exemplary process [600] indicating a use case of crop classification based on extracting a full range hyperspectral data from one or more RGB images, in accordance with exemplary embodiments of the present invention.

Referring to FIG. 6, an exemplary process [600] indicating a use case of crop classification based on extracting a full range hyperspectral data from one or more RGB images, in accordance with exemplary embodiments of the present invention is shown.

At step [602] the method encompasses capturing one or more RGB images or burst video of a tree by a user device.

Next at step [604] two RGB images/frames comprising the tree at time t=0 and t=1 are depicted.

Further at step [606] the method comprises estimating and removing an illumination component from said two RGB images of the tree.

Thereafter at step [608] the two RGB images/frames with removed illumination component are depicted.

Next at step [610] the method comprises performing pixel tracking across the frames using an optical flow model.

Further at step [612] the method comprises cropping and stacking the two RGB images/frames.

Next at step [614] the two cropped RGB images indicating an object of interest i.e. the tree are indicated. Also, thereafter patch level aggregation of motion is achieved.

Further at step [616], RGB to hyperspectral data conversion is done based at least on the patch level aggregation of motion, the pixel tracking across the frames and the removal of illumination component.

Next at step [618], the hyperspectral data/images corresponding to the two RGB images/frames are depicted.

Further, at step [620], the method encompasses performing pixel-level semantic segmentation on the hyperspectral data corresponding to the two RGB images.

Next, at step [622] crop classification is done based on determining of one or more crop related parameters based on the semantic segmentation and a pre-trained data set (i.e. third pre-trained dataset). After crop classification, the results are transmitted to the user device.

As is evident from the above disclosure, the present invention provides a novel solution for extracting a full range hyperspectral data from one or more RGB, images through low-cost, high resolution ground-based devices with the help of artificial intelligence that could self-build and map parameters from the existing RGB images to hyperspectral images. Also, the present invention provides a solution that maps the full range hyperspectral data corresponding to an input RGB data to optimal estimated sensor values to determine one or more parameters related to various fields, wherein such parameters are plotted in a user device to identify various conditions such as in agriculture the conditions may include areas where adequate fertilization has occurred, areas which receive higher photosynthetically active radiations, humidity, temperature and overall crop productivity etc.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

The invention claimed is:

1. A method for extracting a full range hyperspectral data from one or more RGB images, the method comprising:
   receiving, at a transceiver unit from one or more camera devices, one or more RGB images;
   pre-processing, by a processing unit, the one or more RGB images;
   estimating, by the processing unit, an illumination component associated with each pre-processed RGB image of the one or more pre-processed RGB images based on a first pre-trained dataset, wherein the first pre-trained dataset comprises a plurality of data trained based on a depth value associated with each object captured in each image of a plurality of RGB images;

removing, by the processing unit, the illumination component from the each pre-processed RGB image;

tracking, by the processing unit, a trajectory of one or more pixels over one or more frames associated with the each pre-processed RGB image based on an optical flow model;

identifying, by the processing unit, a position of the one or more pixels in one or more adjacent frames of the one or more frames based on a patch defined around said one or more pixels; and extracting, by the processing unit, the full range hyperspectral data from the each pre-processed RGB image corresponding to the one or more RGB images based on at least one of the removal of the illumination component, the trajectory of the one or more pixels and the position of the one or more pixels.

2. The method as claimed in claim 1, wherein the pre-processing comprises at least of a resizing of the one or more RGB images, de-noising of the one or more RGB images and enhancing an image quality of the one or more RGB images.

3. The method as claimed in claim 1, wherein the one or more camera devices comprises one or more Micro-Electro-Mechanical Systems (MEMS).

4. The method as claimed in claim 1, wherein the one or more RGB images are received at the transceiver unit via a master node associated with the one or more camera devices.

5. The method as claimed in claim 1, wherein the extracting, by the processing unit, the full range hyperspectral data is further based on a second pre-trained dataset, and wherein the second pre-trained dataset comprises a plurality of data trained based on a frame by frame conversion of a plurality of RGB images to corresponding Hyperspectral level resolution.

6. The method as claimed in claim 1, wherein estimating, by the processing unit, an illumination component associated with each pre-processed RGB image further comprises:

assigning, by the processing unit, a depth value to every RGB pixel associated with the each pre-processed RGB image based on the first pre-trained dataset, synthesizing, by the processing unit, one or more images of one or more-objects captured in the each pre-processed RGB image under one or more illumination conditions based on the depth value assigned to the every RGB pixel, and estimating, by the processing unit, the illumination component associated with the each pre-processed RGB image based on the synthesized one or more images of the one or more objects, wherein the illumination component is estimated on a pixel level scale.

7. The method as claimed in claim 6, wherein the estimating, by the processing unit, the illumination component is further based on one or more Artificial intelligence techniques.

8. The method as claimed in claim 1, the method comprises determining, by the processing unit, a target RGB value associated with the each pre-processed RGB image under an ideal condition based on:

removing, by the processing unit, the illumination component from the each pre-processed RGB image, retrieving, by the processing unit, an original RGB pixel value of one or more pixels of the each pre-processed RGB image based on the removal of the illumination component, and determining, by the processing unit, the target RGB value based on the original RGB pixel value of the one or more pixels of the each pre-processed RGB image.

9. The method as claimed in claim 1, the method further comprises performing by the processing unit, a pixel-level semantic segmentation on an object of interest present in the full range hyperspectral data corresponding to each RGB image of the one or more RGB images.

10. The method as claimed in claim 9, wherein the pixel-level semantic segmentation is performed based on one or more Artificial intelligence techniques.

11. The method as claimed in claim 9, the method further comprises:

organising, by the processing unit, the full range hyperspectral data corresponding to the each RGB image in one or more band-subsets having similar spectral signatures, and extracting, by the processing unit, one or more spectral and one or more spatial features from the full range hyperspectral data corresponding to the each RGB image based on the organising.

12. The method as claimed in claim 11, the method further comprises determining, by the processing unit, one or more parameters related to at least one of an agriculture and health field based on the one or more extracted spectral features, the one or more extracted spatial features and a third pre-trained dataset.

13. The method as claimed in claim 11, wherein the third pre-trained dataset comprises a plurality of data trained based on a hyperspectral data and a RGB-depth data associated with a plurality of events associated with at least one of the agriculture and the health field.

14. A system for extracting a full range hyperspectral data from one or more RGB images, the system comprising:

a transceiver unit, configured to receive from one or more camera devices, one or more RGB images; and a processing unit, configured to:

pre-process, the one or more RGB images, estimate, an illumination component associated with each pre-processed RGB image of the one or more pre-processed RGB images based on a first pre-trained dataset, wherein the first pre-trained dataset comprises a plurality of data trained based on a depth value associated with each object captured in each image of a plurality of RGB images, remove, the illumination component from the each pre-processed RGB image, track, a trajectory of one or more pixels over one or more frames associated with the each pre-processed RGB image based on an optical flow model, identify, a position of the one or more pixels in one or more adjacent frames of the one or more frames based on a patch defined around said one or more pixels, and extract, the full range hyperspectral data from the each pre-processed RGB image corresponding to the one or more RGB images based on at least one of the removal of the illumination component, the trajectory of the one or more pixels and the position of the one or more pixels.

* * * * *